(12) United States Patent
Huang (10) Patent No.: US 9,261,703 B2
(45) Date of Patent: Feb. 16, 2016

(54) MULTI-VIEW AUTOSTEREOSCOPIC DISPLAY

(75) Inventor: Junejei Huang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 336 days.

(21) Appl. No.: 13/482,941

(22) Filed: May 29, 2012

(65) Prior Publication Data

US 2013/0176538 A1 Jul. 11, 2013

(30) Foreign Application Priority Data

Jan. 11, 2012 (TW) ............................. 101101017 A (51) Int. Cl.
- *G03B 21/00* (2006.01)
- *G02B 27/22* (2006.01)
- *H04N 13/04* (2006.01)

(52) U.S. Cl.
CPC .......... *G02B 27/2214* (2013.01); *G02B 27/225* (2013.01); *H04N 13/0459* (2013.01)

(58) Field of Classification Search
CPC ............. G02B 27/225; G02B 17/0896; H04N 13/0459; H04N 13/0406; G03B 21/142; G03B 21/147
USPC ............................................................ 353/7
See application file for complete search history.

(56) References Cited

U.S. PATENT DOCUMENTS

| 6,795,241 B1 * | 9/2004 | Holzbach ................. 359/463 |
| 8,146,277 B2 | 4/2012 | Engel | |
| 2002/0163482 A1 | 11/2002 | Sullivan | |
| 2005/0185711 A1 | 8/2005 | Pfister et al. | |
| 2007/0132953 A1 | 6/2007 | Silverstein | |
| 2008/0204663 A1 * | 8/2008 | Balogh ..................... 353/10 |
| 2009/0103178 A1 | 4/2009 | Woodgate et al. | |
| 2010/0136921 A1 | 6/2010 | Pedrazzi | |
| 2010/0231701 A1 | 9/2010 | Nelson | |
| 2011/0285968 A1 * | 11/2011 | Huang ..................... 353/31 |
| 2012/0224038 A1 * | 9/2012 | Roth ....................... 348/55 |

FOREIGN PATENT DOCUMENTS

| CN | 101599253 | 12/2009 |
| CN | 102056001 | 5/2011 |
| CN | 102262346 | 2/2014 |
| EP | 0597629 | 1/1999 |

(Continued)

OTHER PUBLICATIONS

Office Action dated Mar. 11, 2014 and English translation from corresponding No. TW101101017.

(Continued)

*Primary Examiner* — Sultan Chowdhury
*Assistant Examiner* — Danell L Owens
(74) *Attorney, Agent, or Firm* — Hauptman Ham, LLP (57) ABSTRACT

A multi-view autostereoscopic display comprising a projection device array and a pair of lenticular arrays is disclosed. The projection device array includes a plurality of projectors. Each of the projectors includes a light source array, which consists of a plurality of light sources for projecting light beams towards a split visual field via the projectors respectively. The pair of the lenticular arrays is disposed between the projection device array and the split visual field so that a portion of the light beams projected from each of the light sources can be obtained at each position on the split visual field.

12 Claims, 13 Drawing Sheets

(56) References Cited

FOREIGN PATENT DOCUMENTS

| | | |
|---|---|---|
| EP | 2014103 | 1/2009 |
| TW | 201142464 | 12/2011 |

OTHER PUBLICATIONS

Office Action dated Feb. 3, 2015 from corresponding application No. CN201210008527.X.

* cited by examiner

MULTI-VIEW AUTOSTEREOSCOPIC DISPLAY

This application claims priority to Taiwan Patent Application No. 101101017 filed on Jan. 11, 2012, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a multi-view autostereoscopic display, and more particularly, to a multi-view autostereoscopic display that combines the time-multiplexing technology and the multiple-projector technology together.

2. Descriptions of the Related Art

According to visual characteristics of human eyes, when two eyes of a human being are watching a same image at the same time, images seen by the two eyes are slightly different because of the spacing of about 65 mm between the two eyes. Thus, a three-dimensional (3D) image is obtained. The 3D displaying technologies may be categorized into stereoscopic displaying technologies and autostereoscopic displaying technologies. According to the ways of imaging, the autostereoscopic displaying technologies are further divided into the spatial-multiplexing autostereoscopic displaying technology, the multiple-projector autostereoscopic displaying technology and the time-multiplexing autostereoscopic displaying technology.

The conventional spatial-multiplexing autostereoscopic displaying technology utilizes a parallax barrier or lenticular to control traveling directions of light rays and to project images of different viewing angles to different spatial positions and further to the left and the right eyes, thus generating a 3D image. However, because the image is divided into a left-eye image and a right-eye image, both brightness and resolution of the images are decreased.

Figure 1:
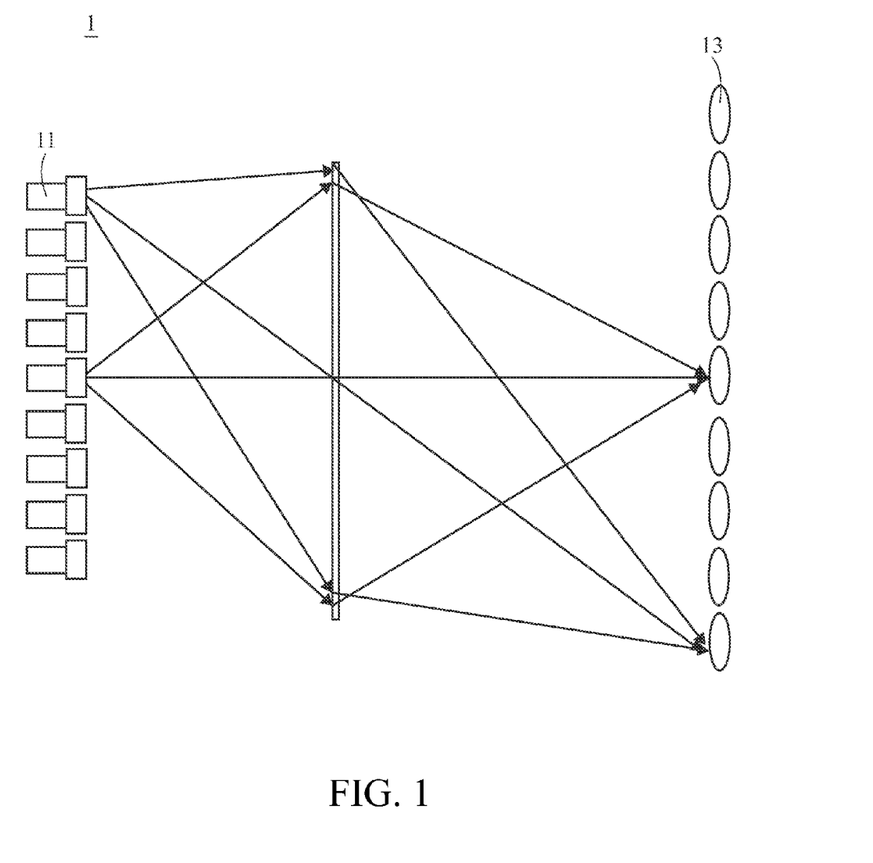
FIG. 1 is a schematic view of the conventional multiple-projector autostereoscopic displaying technology.

In order to maintain the resolution of the images, the multiple-projector autostereoscopic displaying technology and the time-multiplexing autostereoscopic displaying technology are often used. With reference to FIG. 1, a conventional multi-projector autostereoscopic displaying system 1 comprises a plurality of projectors 11 arranged in an array. Images are projected by the projectors 11 to split visual fields 13 at different positions in one-to-one correspondence, and then the different images will be seen by the left eye and the right eye respectively to achieve an autostereoscopic displaying effect. As the viewing angles increase, the number of projectors required is increased and the projection distance is also extended. Consequently, the space needed becomes larger and the cost becomes higher.

Figure 2:
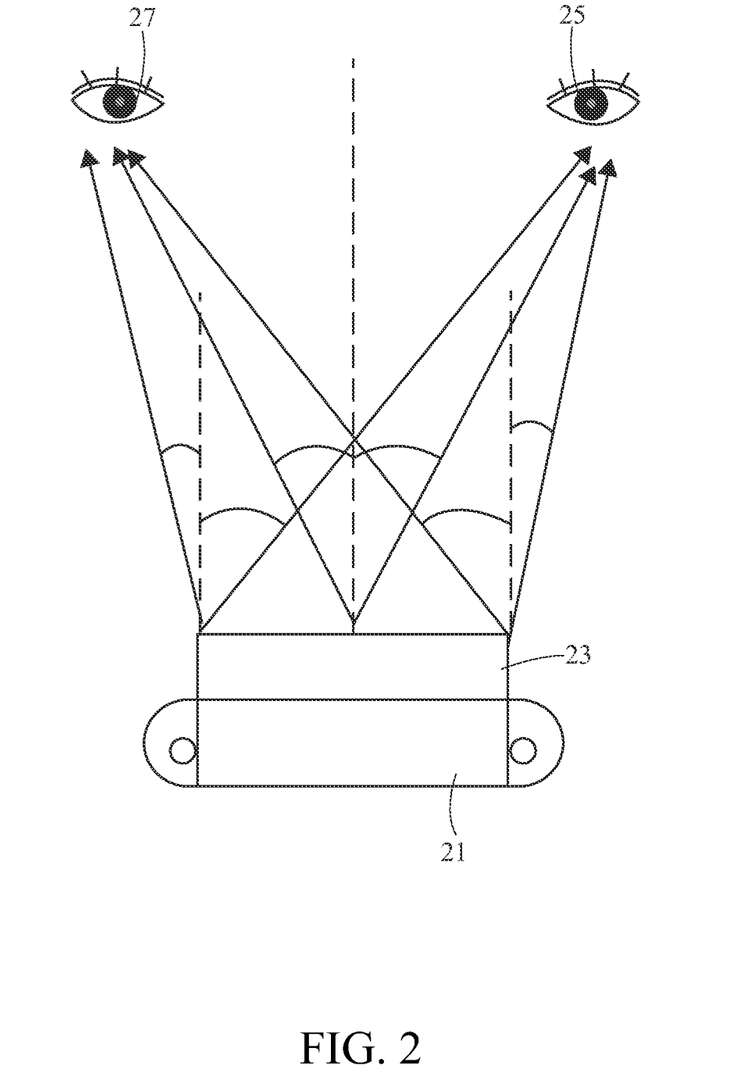
FIG. 2 is a schematic view of the conventional time-multiplexing autostereoscopic displaying apparatus.

With reference to FIG. 2, the time-multiplexing projection apparatus 2 employs a set of directional backlights 21 in combination with a rapid-response panel 23 to sequentially display a left-eye image 25 and a right-eye image 27. In this way, different images will be seen by the left eye and the right eye of the viewer and then combined to form an autostereoscopic image. As the left-eye image 25 and the right-eye image 27 must be processed within one frame period, the frame updating frequency of the projection apparatus must be increased and the number of light sources in the projection apparatus becomes a focus of the design. However, because the displaying region is relatively small, this kind of projection apparatus is usually applicable to small display devices.

Accordingly, it is important to provide a novel multi-view autostereoscopic display.

SUMMARY OF THE INVENTION

The primary objective of the present invention is to provide a multi-view autostereoscopic display which combines characteristics of the time-multiplexing autostereoscopic displaying technology and the multiple-projector autostereoscopic displaying technology together. The image presented by the multi-view autostereoscopic display of the present invention is not divided into different split visual fields, but is provided to the plurality of visual fields at once, such that the left eye and the right eye will see different images at the same time. Thereby, the multi-view autostereoscopic display with high brightness and desirable resolution is obtained.

Another objective of the present invention is to provide a multi-view autostereoscopic display, in which by arranging a plurality of projectors to be stacked on each other, the space occupation is reduced as compared to the case where projectors are arranged in parallel. A plurality of light sources are disposed in each projector and a timing controller is used to switch between the ON time and the OFF time of each light source. Thereby, the multiplication effect for projection of the projectors can be achieved, and the space occupation and the cost may be reduced.

Yet a further objective of the present invention is to provide a multi-view autostereoscopic display which, by increasing the number of projectors, eliminates the use of the light modulator with a high magnification factor for modulating the frame updating frequency and enlarges the projection region.

To achieve the aforesaid objectives, the present invention provides a multi-view autostereoscopic display, which comprises a projection device array and a pair of lenticular arrays. The projection device array includes a plurality of projectors, and each of the projectors comprises a light source array which consists of a plurality of light sources. The light sources generate light beams for being projected towards the pair of lenticular arrays via the projectors respectively, and subsequently towards the split visual field via the pair of lenticular arrays. The pair of lenticular arrays is disposed between the projection device array and the split visual field, and the light beam generated from each of the light sources is projected to each position on the split visual field.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 3:
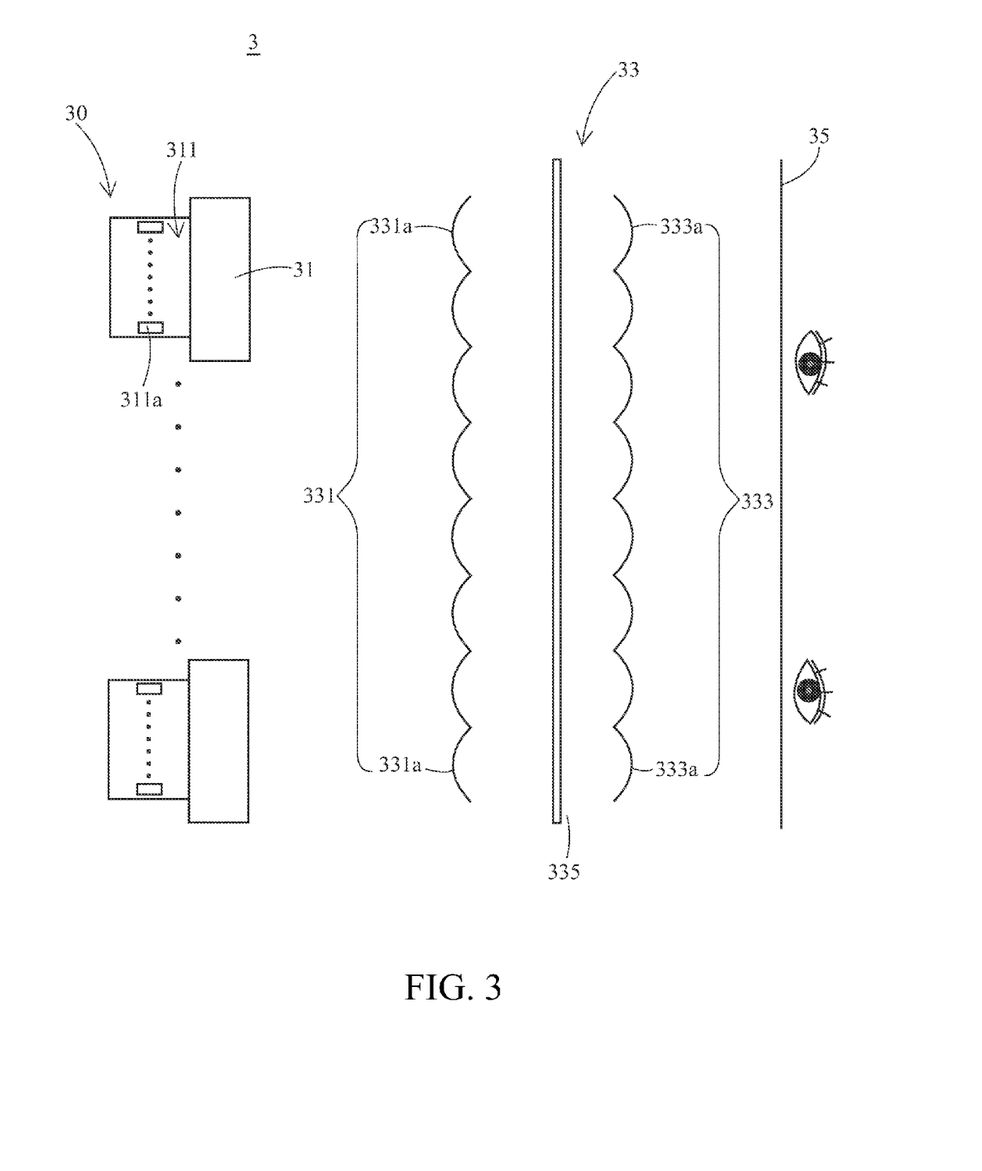
FIG. 3 is a schematic view of a multi-view autostereoscopic display of the present invention.

With reference to FIG. 3, there is shown a schematic view of a multi-view autostereoscopic display 3 of the present invention. The multi-view autostereoscopic display 3 mainly comprises a projection device array 30 and a pair of lenticular arrays 33. The projection device array 30 includes a plurality of projectors 31, and each of the projectors 31 comprises a light source array 311 which consists of a plurality of light sources 311a. The light sources 311a generate light beams for being projected towards the pair of lenticular arrays 33 via the projectors 31 respectively, and subsequently towards a split visual field 35 via the pair of lenticular arrays 33. The pair of lenticular arrays 33 is disposed between the projection device array 30 and the split visual field 35 so that a portion of the light beams projected from each of the light sources 311a can be obtained at each position on the split visual field 35.

Referring still to FIG. 3, the pair of lenticular arrays 33 comprises a first lenticular array 331 and a second lenticular array 333. Preferably, the pair of lenticular arrays further comprises a diffuser 335 disposed between the first lenticular array 331 and the second lenticular array 333. The first lenticular array comprises a plurality of first optical refraction modulation portions 331a being disposed towards the projection device array 30 to image the light sources 331a onto the diffuser 335, and the second lenticular array 333 comprises a plurality of second optical refraction modulation portions 333a being disposed towards the split visual field 35 to transmit the light beams thereto.

Figure 4:
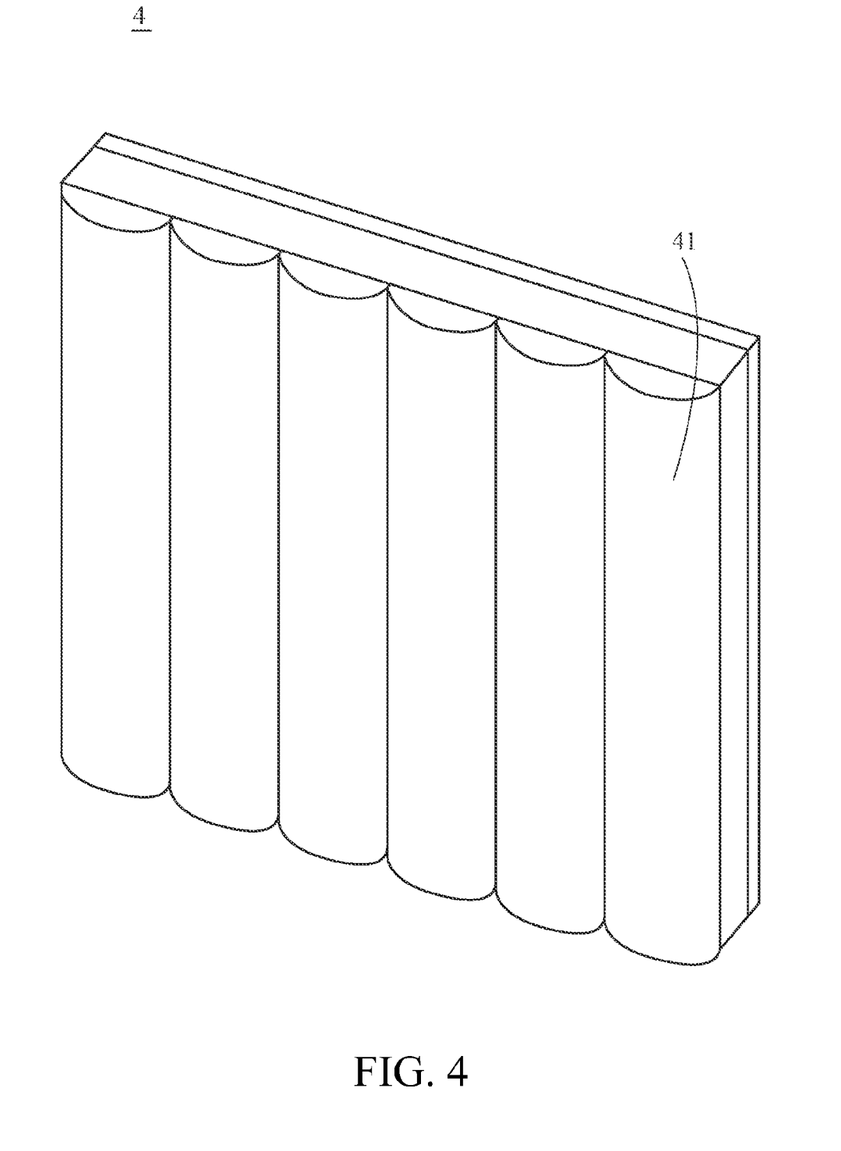
FIG. 4 is a schematic view of a lenticular array.

With reference to FIG. 4, the optical refraction modulation portions 41 of a lenticular array 4 consist of strip-shaped convex lenses, and each of the optical refraction modulation portions 41 has a refractive power that varies gradually in a radial direction so that the lenticulars have the function of imaging. Further, because the light beams are projected at different angles, different images will be seen by the left eye and the right eye at a certain distance and angle.

Figure 5:
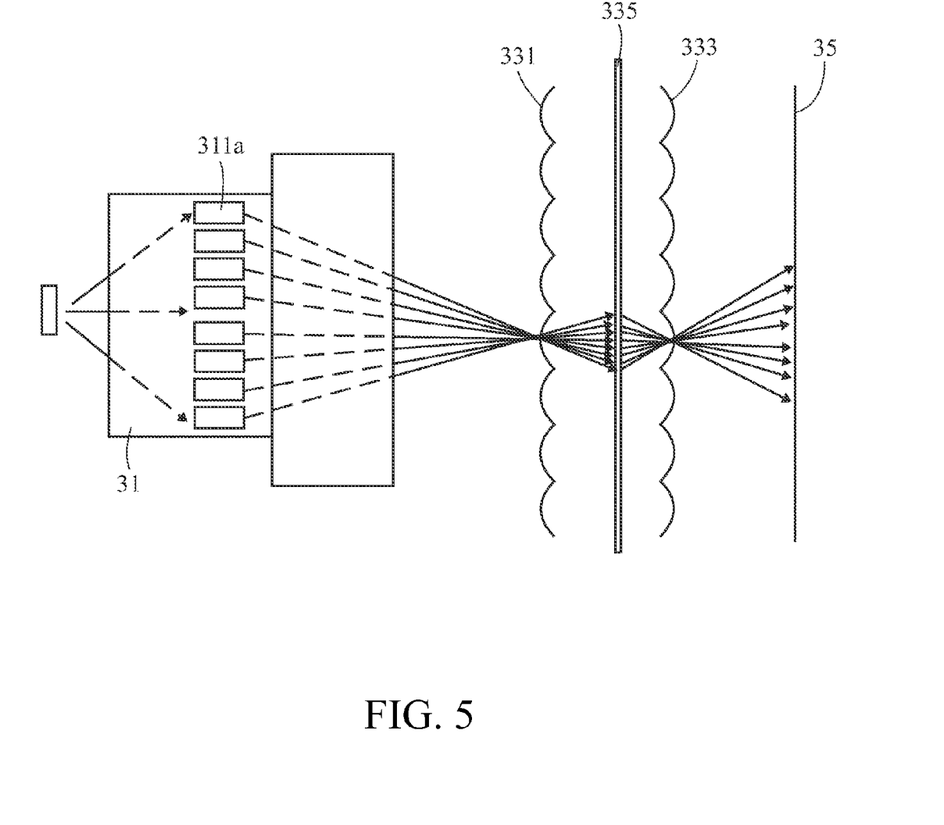
FIG. 5 is a schematic partial view of the multi-view autostereoscopic display of the present invention.

With reference to FIG. 5, there is shown a schematic partial view showing one of the projectors of the multi-view autostereoscopic display. As shown, the projector 31 comprises a plurality of light sources 311a arranged therein. The light sources 311a are not turned on at the same time, but are switched by a timing controller (not shown) in accordance with a time interval. Because of the characteristic of persistence of vision of human eyes, a first image when being watched forms an image on the retina, which is inputted to the brain via the optic nerves so that the first image is perceived. After the first image seen by the eyes disappears at the moment when the first image is changed into a second image, the first image in the optic nerves will not disappear immediately but will persist for a time period. The time interval that is the most suitable for human eyes is about $1/48$~$1/100$ second. If the time interval between the first image and the second image is greater than $1/48$~$1/100$ second, the images will become noncontinuous and result in the effect of image interruption. In order for the user to perceive continuous images, the interval between the images generally must be less than $1/60$ second. In this embodiment of the present invention, if a quantity of the projectors of the projection device array is N and a quantity of the light sources in each of the projectors is M, then the timing controller must control the time interval between the images to be less than $1/(60 M)$ second.

Figure 6:
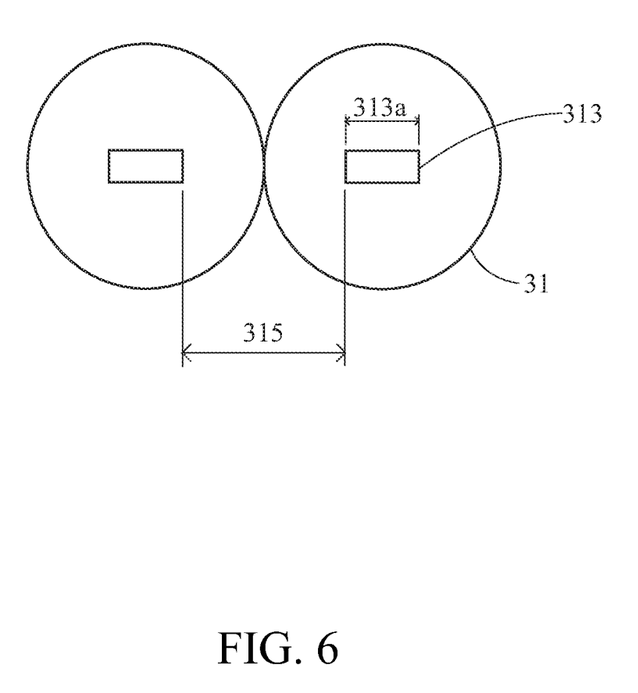
FIG. 6 is a schematic view showing how projectors are stacked on each other according to the preferred embodiment of the present invention.
Figure 7:
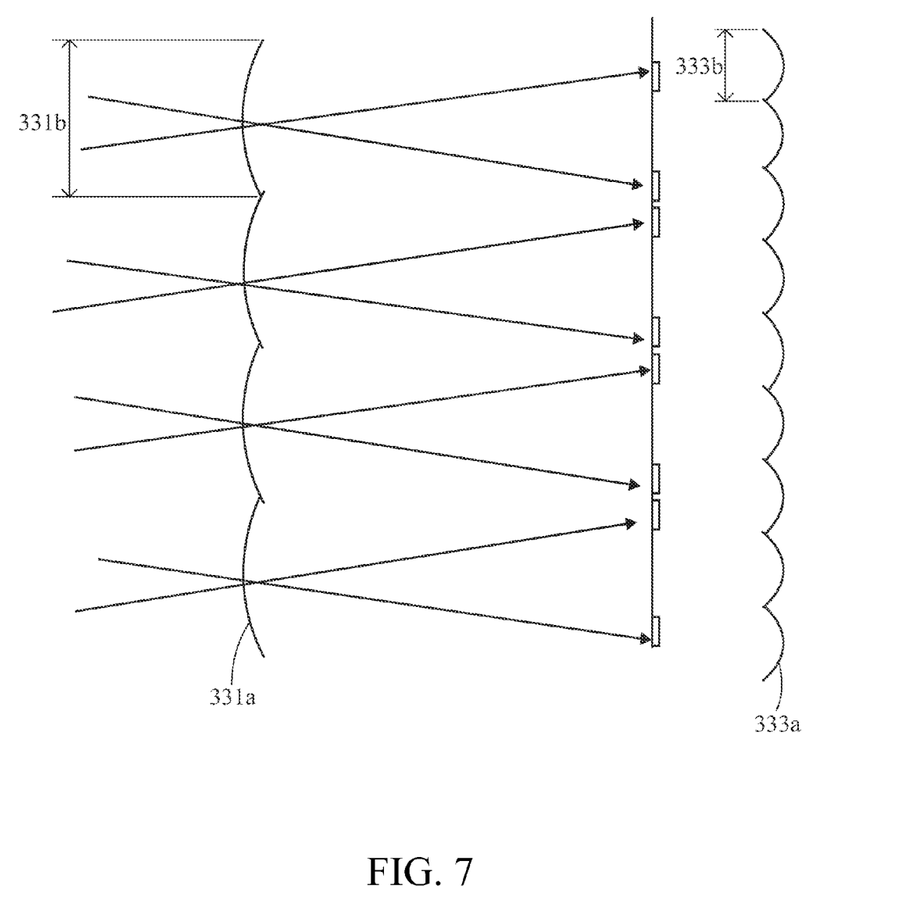
FIG. 7 is a schematic view showing a proportional relationship of lenticulars according to the preferred embodiment of the present invention, comprising two projectors.

With reference to FIG. 6 and FIG. 7 together, there is shown a front view of a projection plane according to the preferred embodiment of the present invention. As shown, the projectors 31 are arranged along a horizontal direction, and the quantity of the projectors 31 is two. Each of the projectors has an exit pupil 313. In order for the light sources 311a to be arranged side by side, the exit pupil 313 may be designed to be rectangular. The exit pupil 313 has a width 313a in the horizontal direction. The adjacent exit pupils 313 define an interval 315 therebetween in the horizontal direction, and the interval 315 is an integral multiple of two of the width 313a of the exit pupil 313. Furthermore, a ratio of a pitch 331b of the first optical refraction modulation portions 331a to a pitch 333b of the second optical refraction modulation portions 333a is ((the integral multiple of 1)+1):1.

Figure 8:
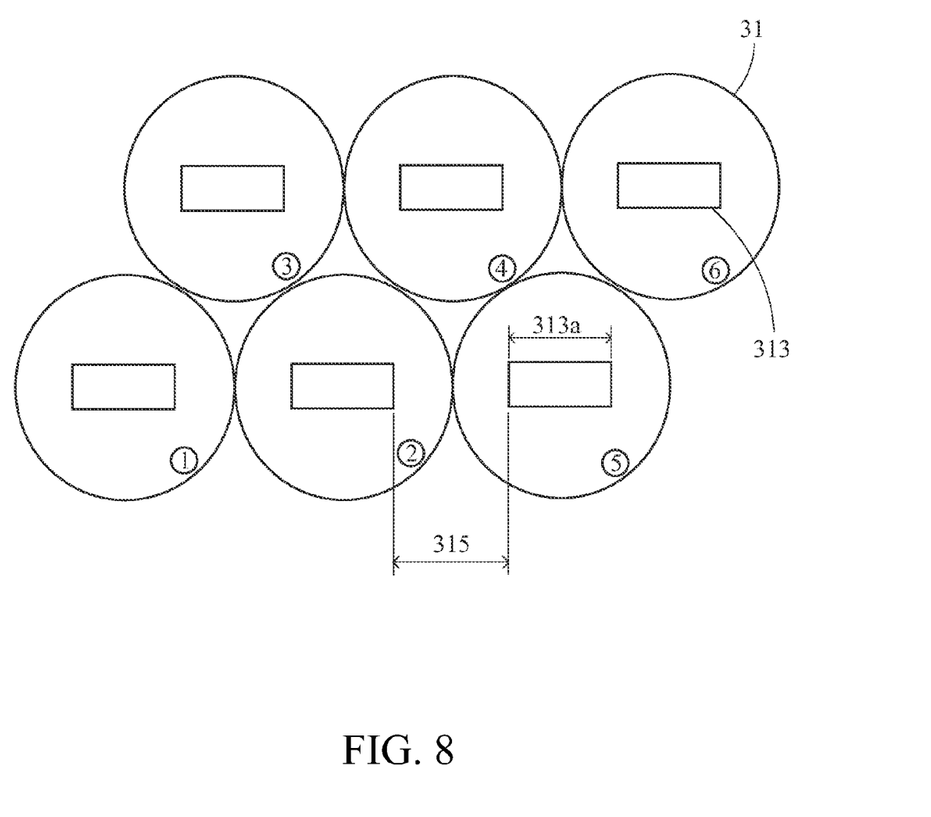
FIG. 8 is a schematic view showing how projectors are stacked on each other according to the other preferred embodiments of the present invention.

With reference to FIG. 8, there is shown a schematic view showing arrangement of the projectors according to another preferred embodiment of the present invention. The quantity of the projectors is greater than two, and the projectors 31 may be arranged in the horizontal direction and further arranged to be stacked and interlaced along a vertical direction. As shown, the projectors 31 are arranged in a way as shown by designations 1 to 3 when the quantity of the projectors is three, are arranged in a way as shown by designations 1 to 4 when the quantity of the projectors is four, and so on, and are arranged in a way as shown by designations 1 to 6 when the quantity of the projectors is six.

Each of the projectors 31 also has an exit pupil 313, which has a width 313a in the horizontal direction. The adjacent exit pupils 313 define an interval 315 therebetween in the horizontal direction, and the interval 315 is (13−2N) times the width of the exit pupil 313 when the quantity N of the projectors 31 is greater than two. It shall be noted that, in order to prevent the projectors 31 from blocking each other's light sources 311a, the quantity of the projectors 31 in the horizontal direction shall not be greater than three and the quantity of all the projectors 31 shall not be greater than six mainly because that, when the width of the exit pupil 313 is one times and the quantity of the projectors is six, the interval 315 will be calculated to be one according to the aforesaid formula for the interval 315. As shown in FIG. 8, because the space in the projection direction of the projectors 31 has already been completely filled, the projected images may interfere with each other if they are greater than the aforesaid values. The sequence of arrangement of the projectors 31 is as shown in FIG. 8.

Figure 9:
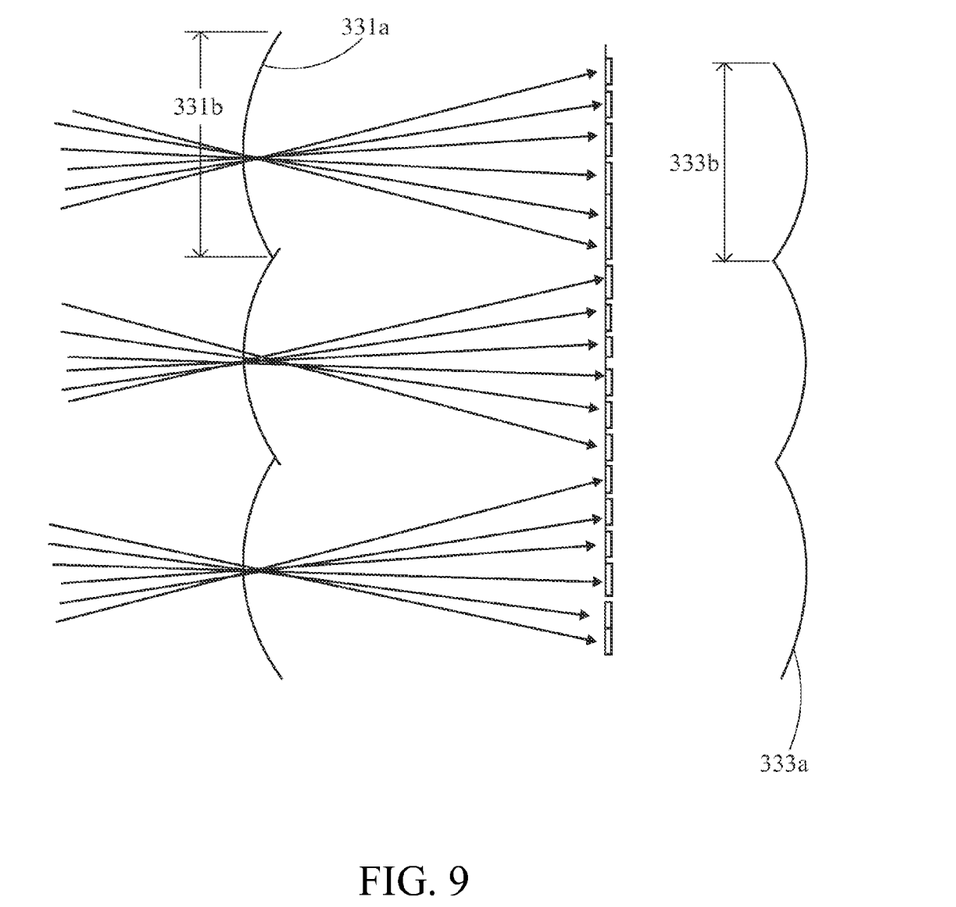
FIG. 9 is a schematic view showing a proportional relationship of lenticulars according to the preferred embodiment of the present invention, comprising six projectors.
Figure 10:
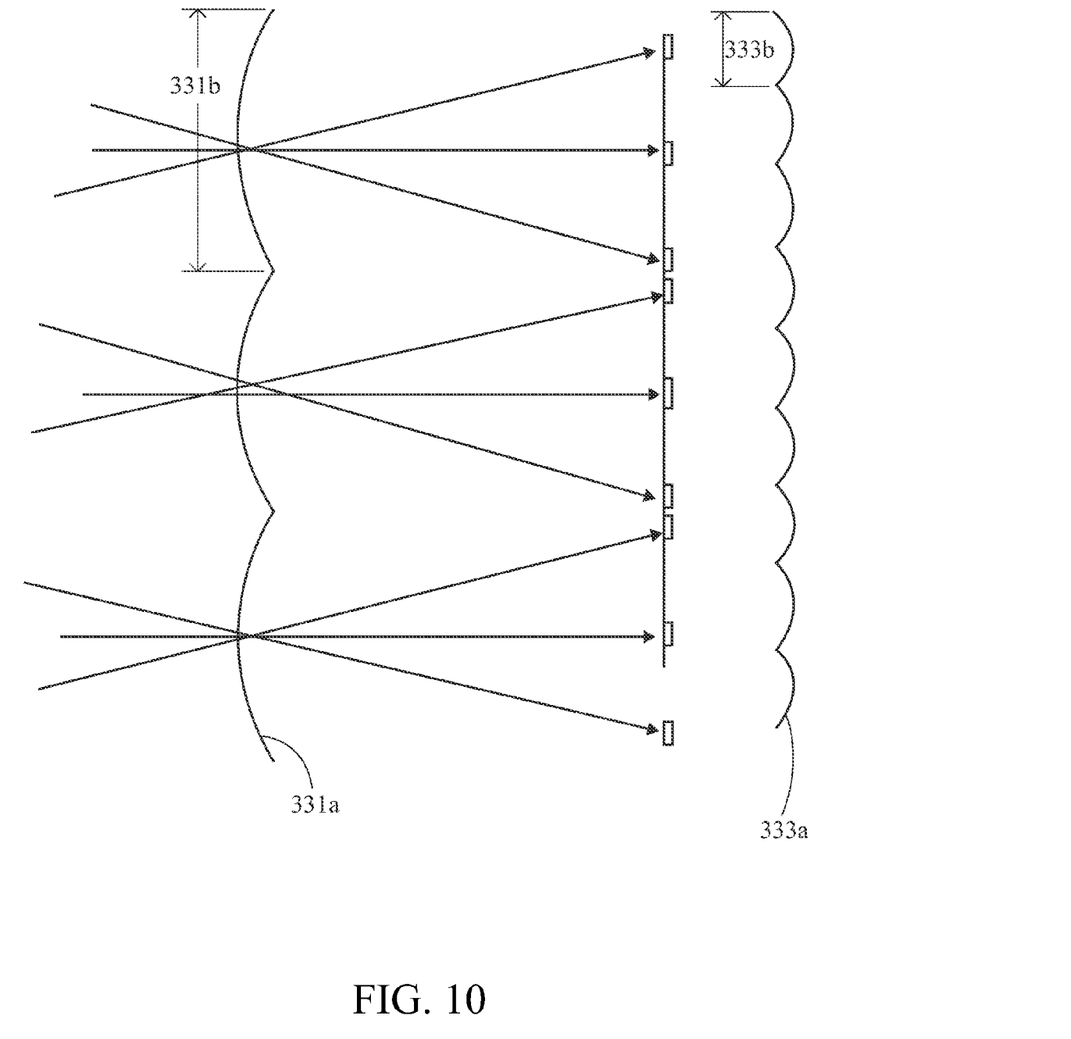
FIG. 10 is a schematic view showing a proportional relationship of lenticulars according to the preferred embodiment of the present invention, comprising three projectors.
Figure 11:
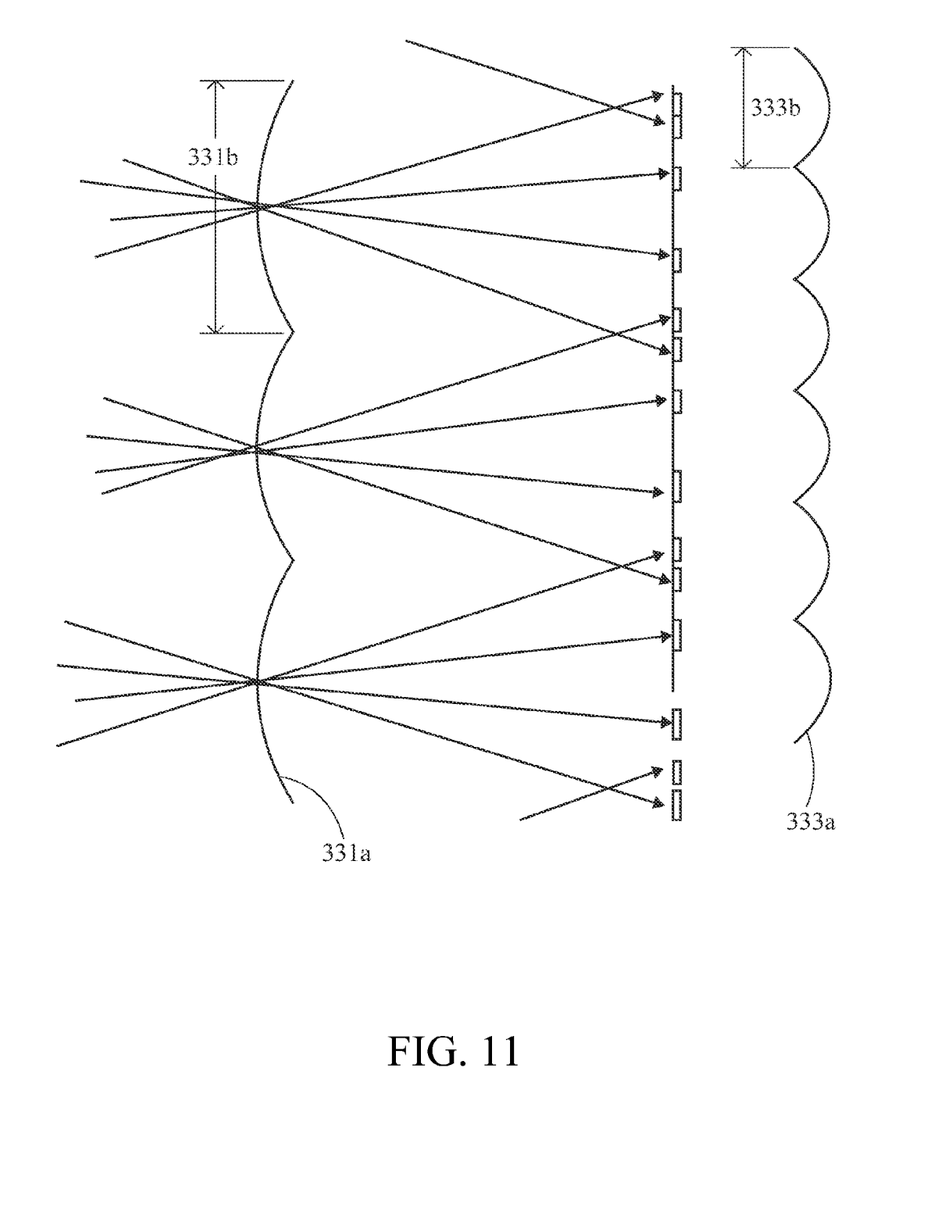
FIG. 11 is a schematic view showing a proportional relationship of lenticulars according to the preferred embodiment of the present invention, comprising four projectors.
Figure 12:
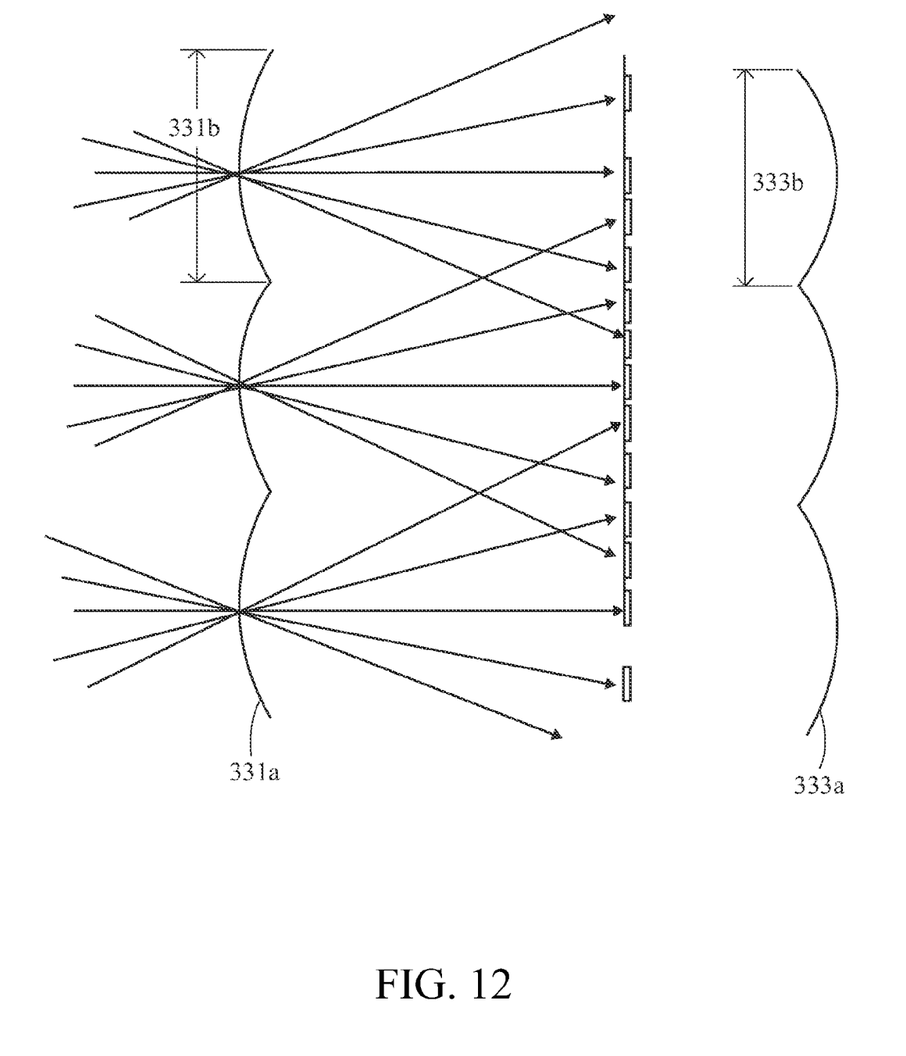
FIG. 12 is schematic views showing proportional relationships of the lenticulars according to the present invention, comprising five projectors.

With reference to FIG. 9 to FIG. 12, there are shown schematic views showing pitch relationships of the lenticular arrays in this embodiment. As shown in FIG. 9, a ratio of a pitch 331b of the first optical refraction modulation portions 331a to a pitch 333b of the second optical refraction modulation portions 333a is 1:1 when the quantity N of the projectors 31 is six. As shown in FIG. 10 to FIG. 12, a ratio of a pitch of the first optical refraction modulation portions to a pitch of the second optical refraction modulation portions is (6−N):1 when the quantity N of the projectors is between three and five.

Figure 13:
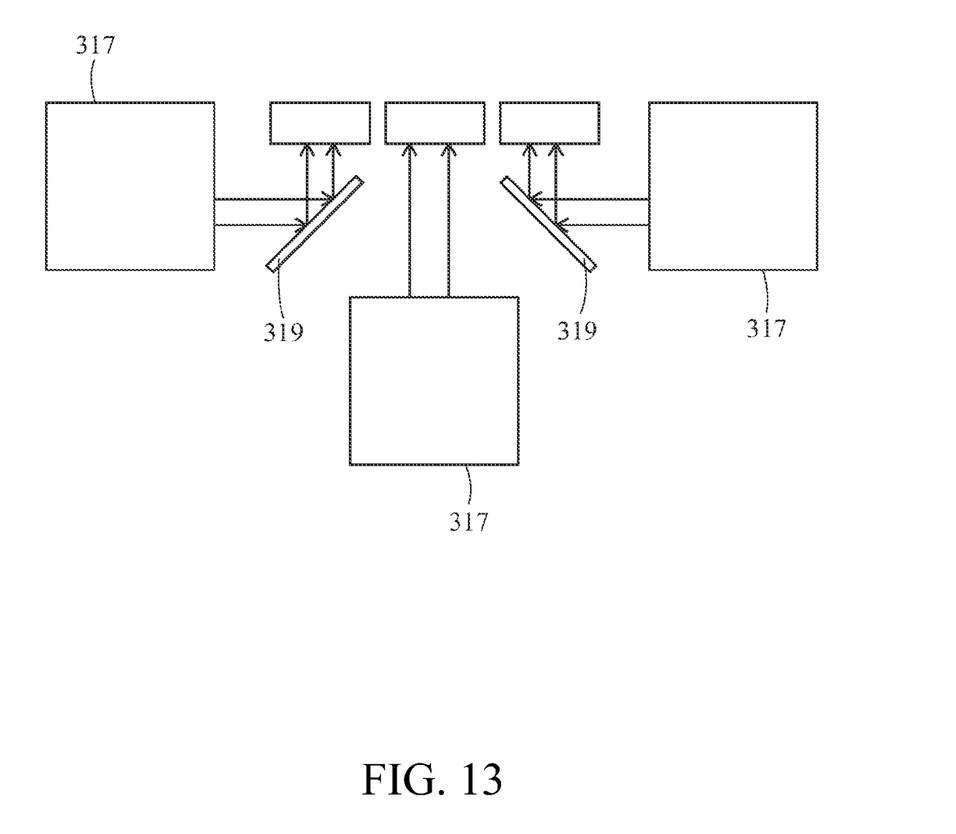
FIG. 13 is a schematic view showing a configuration of the multi-view autostereoscopic display of the present invention.

In actual arrangement, the projectors 31 may interfere with each other when being stacked because of the limited space, so the projectors 31 are not limited to be arranged side by side as long as the exit pupils 313 are arranged in accordance with the aforesaid embodiment. Here, three projectors 31 will be illustrated as an example. With reference to FIG. 13, there is shown a top view illustrating arrangement of the projectors 31. Optical apparatuses 317 can be arranged flexibly according to the space as long as they project light beams towards a same direction via optical components 319. Conceivably, the left optical apparatus 317 and the right optical apparatus 317 are disposed at the same level and the middle optical apparatus 317 is disposed at a slightly higher level, so the final arrangement is as shown by the projectors 31 with the designations 1 to 3 in FIG. 8.

According to the above descriptions, the multi-view autostereoscopic display of the present invention combines characteristics of the time-multiplexing autostereoscopic displaying technology and the multiple-projector autostereoscopic displaying technology together. Thereby, a multi-view autostereoscopic display with multiple visual fields, high brightness and desirable resolution can be obtained. Meanwhile, the multi-view autostereoscopic display can reduce the space occupation and the cost.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A multi-view autostereoscopic display, comprising:
a pair of lenticular arrays; and
a projection device array including a plurality of projectors, each of the projectors comprising a light source array which consists of a plurality of light sources, the light sources generating light beams for being projected towards the pair of lenticular arrays via the projectors respectively, and subsequently towards a split visual field via the pair of lenticular arrays;
wherein
the pair of lenticular arrays is disposed between the projection device array and the split visual field, and the light beam generated from each of the light sources is projected to each position on the split visual field;
a quantity of the plurality of projectors is N, a quantity of the light sources in each of the projectors is M, and the plurality of projectors is arranged along a horizontal direction;
each of the projectors comprises an exit pupil, the exit pupil having a width in the horizontal direction; and
when N is greater than two, an interval between adjacent exit pupils is (13-2N) times the width of the exit pupil.

2. The multi-view autostereoscopic display as claimed in claim 1, wherein the pair of lenticular arrays comprises a first lenticular array and a second lenticular array, in which the first lenticular array comprises a plurality of first optical refraction modulation portions being disposed towards the projection device array to receive the light beams, and the second lenticular array comprises a plurality of second optical refraction modulation portions being disposed towards the split visual field to transmit the light beams thereto.

3. The multi-view autostereoscopic display as claimed in claim 2, further comprising a diffuser disposed between the first lenticular array and the second lenticular array.

4. The multi-view autostereoscopic display as claimed in claim 1, further comprising a timing controller to switch the light sources in accordance with a time interval.

5. The multi-view autostereoscopic display as claimed in claim 4, wherein the time interval is less than $1/(60M)$ second.

6. The multi-view autostereoscopic display as claimed in claim 1, wherein the plurality of projectors is arranged to be stacked and interlaced along a vertical direction.

7. The multi-view autostereoscopic display as claimed in claim 1 wherein a quantity of the projectors in the horizontal direction is no greater than three.

8. The multi-view autostereoscopic display as claimed in claim 1, wherein N is no greater than six.

9. The multi-view autostereoscopic display as claimed in claim 1, wherein a ratio of a pitch of the plurality of first optical refraction modulation portions to a pitch of the plurality of second optical refraction modulation portions is (6-N): 1 when N is less than six.

10. The multi-view autostereoscopic display as claimed in claim 1, wherein a ratio of a pitch of the plurality of first optical refraction modulation portions to a pitch of the plurality of second optical refraction modulation portions is 1:1 when N is six.

11. The multi-view autostereoscopic display as claimed in claim 1, wherein the adjacent exit pupils define an interval therebetween in the horizontal direction, and the interval is an integer multiple of two of the width of the exit pupil when N is equal to two.

12. The multi-view autostereoscopic display as claimed in claim 11, wherein a ratio of a pitch of the plurality of first optical refraction modulation portions to a pitch of the plurality of second optical refraction modulation portions is ((the integer multiple of 1)+1): 1.

* * * * *